US012634585B1

(12) United States Patent
Llorca et al.

(10) Patent No.: US 12,634,585 B1
(45) Date of Patent: May 19, 2026

(54) CAMERA CONTROL USER INTERFACE

(71) Applicant: Peregrine Technologies, Inc., San Francisco, CA (US)

(72) Inventors: Antoine Llorca, Berkeley, CA (US); Lorine Colas, Oakland, CA (US)

(73) Assignee: Peregrine Technologies, Inc., San Francisco, CA (US)

( * ) Notice: Subject to any disclaimer, the term of this patent is extended or adjusted under 35 U.S.C. 154(b) by 0 days.

(21) Appl. No.: 19/263,286

(22) Filed: Jul. 8, 2025

(51) Int. Cl.
| | |
|---|---|
| *H04N 23/695* | (2023.01) |
| *G06F 3/01* | (2006.01) |
| *H04N 23/62* | (2023.01) |
| *H04N 23/63* | (2023.01) |
| *H04N 23/69* | (2023.01) |

(52) U.S. Cl.
CPC .......... *H04N 23/695* (2023.01); *G06F 3/017* (2013.01); *H04N 23/62* (2023.01); *H04N 23/631* (2023.01); *H04N 23/633* (2023.01); *H04N 23/69* (2023.01)

(58) Field of Classification Search
None
See application file for complete search history.

(56) References Cited

U.S. PATENT DOCUMENTS

| | | | | |
|---|---|---|---|---|
| 2014/0146125 | A1* | 5/2014 | Kristiansen | H04N 23/90 348/14.03 |
| 2019/0349530 | A1* | 11/2019 | Niga | H04N 23/631 |
| 2023/0384925 | A1* | 11/2023 | Chen | G06F 3/017 |
| 2025/0168510 | A1* | 5/2025 | Sato | H04N 23/631 |
| 2025/0294256 | A1* | 9/2025 | Kaneko | H04N 23/695 |

FOREIGN PATENT DOCUMENTS

WO    WO2010134725 A2 * 11/2010

* cited by examiner

*Primary Examiner* — Christopher Braniff
(74) *Attorney, Agent, or Firm* — Van Pelt, Yi & James LLP

(57) ABSTRACT

An indication of a start point of a user interface gesture on an image of a displayed stream from a camera is received. A visual overlay representing a direction and a magnitude of the user interface gesture is provided as the user interface gesture is updated while maintaining current pan and tilt settings of the displayed stream. An indication of an end point of the user interface gesture is received. Amplitudes of changes for the current pan and tilt settings are determined based on the user interface gesture. Pan and tilt control instructions are generated based on the determined amplitude of changes. The generated pan and tilt control instructions are provided to a camera controller for physically modifying pan and tilt of the camera.

20 Claims, 17 Drawing Sheets

300

308

700

702

704

CAMERA CONTROL USER INTERFACE

BACKGROUND OF THE INVENTION

Monitoring systems with live camera streams operated by a remote user offer the ability to remotely inspect an environment through one or more cameras and its features. This interaction between the camera and user can often be underwhelming. For example, inconsistent control schemes and non-intuitive user interfaces make it difficult for a user to operate the camera freely. Therefore, there exists a need for a more effective user interface for controlling the camera.

BRIEF DESCRIPTION OF THE DRA WINGS

Various embodiments of the invention are disclosed in the following detailed description and the accompanying drawings.

DETAILED DESCRIPTION

Figure 1:
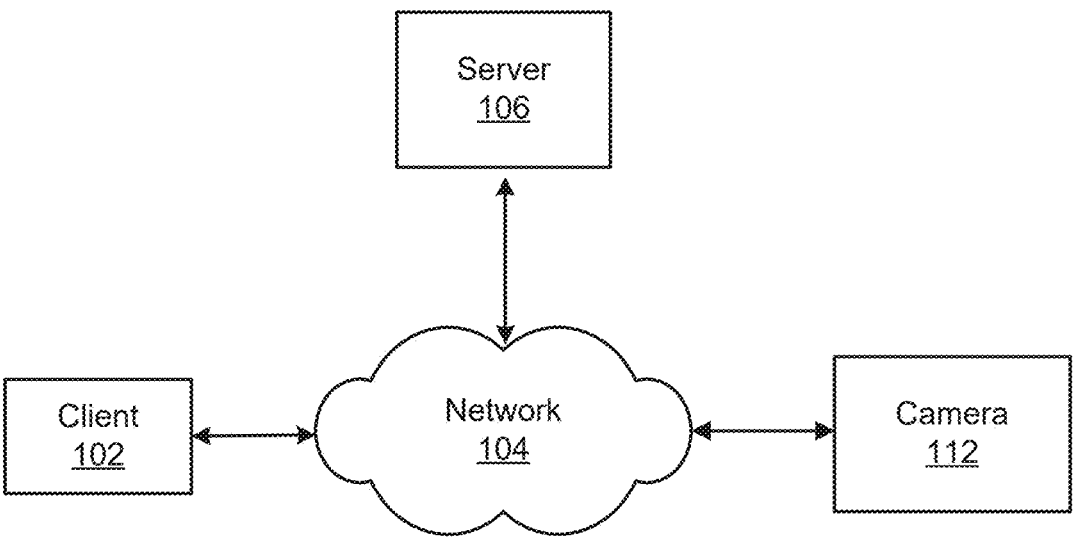
FIG. 1 is a block diagram illustrating an embodiment of a network environment for a camera control user interface.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

When using an interface to control movement of a camera (e.g., pan, tilt, zoom camera), lack of or delayed feedback, especially when adjusting camera angles and perspectives, creates confusion and constrains the user's ability to proficiently operate the camera. Traditional camera control systems often lack contextual awareness, fail to provide predictive movement capabilities, and do not offer adaptive control mechanisms that adjust to different environmental conditions or user preferences. There exists a need for a more effective user interface between the operator and camera that provides improved feedback, intuitive gesture mapping, contextual awareness, and adaptive control mechanisms.

A camera control user interface is disclosed. For example, a live camera stream is displayed onto a screen with a user interface. In some embodiments, the user interface has interactable features for operating the camera. For example, the user can perform gestures on the user interface or interact with user interface elements. The gestures may be performed directly or indirectly, such as with a mouse, joystick, controller, touch screen, eye tracking device, voice commands, or motion sensors. While the gesture is performed, a visual representation of the action is overlaid onto the live displayed stream (e.g., video stream), providing instantaneous feedback. When the action is completed, it is processed into instructions, transmitted to the camera, and executed by the camera. Intuitive gestures and interactions common in digital map navigation and digital screen interfaces may be mapped to executable camera commands such as pan, zoom, focus, tilt, exposure control, white balance adjustment, image stabilization, and/or motion tracking to create a user-friendly and cohesive experience. Additional embodiments include machine learning algorithms that adapt to user preferences and environmental conditions, predictive movement based on detected objects or motion patterns, and/or multi-camera coordination for seamless switching between camera views. Accurate mappings between user interface gestures and camera control as well as the rapid feedback provided by the visual overlay and the live camera stream create a seamless interaction between the user and the camera.

In some embodiments, an indication of a start point of a user interface gesture on an image of the displayed stream from a camera is received. For example, the user may interact with the image using contact-based or remote interactions, including but not limited to touch input, mouse clicks, voice commands, eye tracking, or motion sensor input. In various embodiments, a visual overlay representing the direction and magnitude of the user interface gesture is provided as the user interface gesture is updated. During the user interface gesture, the current pan and tilt settings of the displayed stream are maintained. The visual overlay allows the user to receive immediate feedback on how the camera control system may process the user's gesture. An indication of an end point of the user interface gesture is received. The amplitudes of changes for the current pan and tilt settings based on the user interface gesture are determined. For example, the amplitudes of changes is determined based on the start and end points of the user interface gesture and may include distance and angle between the two points. Based on the determined amplitudes of changes, pan and tilt control instructions are generated. The mapping between the amplitudes of changes and camera control instructions may or may not correspond to physical distances in the real world and may incorporate scaling factors, acceleration curves, or adaptive sensitivity based on the camera's current state. The generated pan and tilt control instructions are provided to a camera controller for physically modifying pan and tilt settings of the camera. In some embodiments, additional gestures may map to other camera control features such as zoom, focus, light exposure, white balance, preset positional recall, and/or image stabilization.

In some embodiments, the camera control user interface incorporates advanced gesture recognition capabilities that can distinguish between different types of user inputs and adapt accordingly. The camera control user interface may employ machine learning algorithms to learn user preferences and optimize gesture-to-command mappings over time. For example, the system may track user behavior patterns and automatically adjust sensitivity settings, gesture thresholds, or command mappings to improve user experience.

In various embodiments, multi-touch gestures are supported, allowing users to perform complex camera operations through simultaneous finger movements. For example, a two-finger pinch gesture may control zoom while simultaneously rotating the fingers controls camera rotation. Three-finger gestures may activate advanced features such as automated tracking modes or preset configurations.

In some embodiments, the system includes predictive movement capabilities that anticipate user intentions based on gesture patterns and environmental context. The system may analyze the current camera view, detect objects of interest, and provide movement suggestions or automated tracking assistance. For example, if the system detects a moving object in the camera view and recognizes a user gesture pattern consistent with tracking behavior, it may automatically engage object tracking mode.

In various embodiments, the camera control system incorporates environmental sensors and contextual awareness features. The system may automatically adjust camera settings based on lighting conditions, weather data, time of day, or detected scene content. For example, in low-light conditions, the system may automatically suggest or implement exposure adjustments while modifying gesture sensitivity to account for potentially less precise user input.

In various embodiments, visual overlays on the camera control interface include dynamic elements that change based on environmental conditions, camera capabilities, and user preferences. The system may display confidence indicators showing the likelihood of successful gesture execution, or warning indicators when gestures may exceed camera physical limits.

In various embodiments, control sensitivity is automatically adjusted based on the current zoom level, lighting conditions, and/or detected scene complexity. For example, when the camera is zoomed in significantly, gesture sensitivity may be reduced to prevent over-correction, while wide-angle views may allow for more aggressive gesture interpretation.

In various embodiments, multiple users may control the same camera system collaboratively, with the system managing priority, conflict resolution, and permission systems. The interface may display indicators showing which user currently has control and allow for seamless handoff between operators.

In various embodiments, multiple cameras may be operated through the same camera control interface. For example, the camera control interface may allow switching between cameras connected to the same camera system. The system may save the most recent camera settings of each camera in the system. The interface may display indicators showing which camera stream is currently displayed on the interface. The interface may also display a map with the locations of the cameras connected to the camera control system.

FIG. 1 is a block diagram illustrating an embodiment of a network environment for a camera control user interface. In the example shown, client 102, server 106, and camera 112 are connected via network 104. Network 104 may be a public or private network. In some embodiments, network 104 is a public network system such as the internet. Examples of network 104 include one or more of the following: a direct or indirect physical communication connection, internet, intranet, Local Area Network, Wide Area Network, Storage Area Network, cellular networks, satellite networks, mesh networks, and any other form of connecting two or more systems, components, or storage devices together. User interface gestures are input to client 102 and sent to server 106 to be processed into camera control instructions for camera 112. Once camera 112 executes the instructions, the updated camera feed can be viewed on client 102.

In some embodiments, client 102 is an example client operating camera 112 through network 104. For example, client 102 can be a network device, such as a desktop computer, a laptop, a tablet, a phone, a smart watch, an augmented reality headset, a virtual reality headset, or another network computing device. As a network device, client 102 may receive a live stream feed from camera 112 that can be viewed on the screen of client 102 or a separate screen connected to client 102. Client 102 provides a user interface that a user can interact with via gestures. For example, the user may draw on the screen, use a mouse, or use a physically connected or remote device to input their gestures. The gestures are sent to server 106 for processing via network 104.

In some embodiments, server 106 processes user gestures into camera control instructions. For example, server 106 receives user interface gestures from client 102 via network 104. In some embodiments, the received user interface gesture data includes at least the beginning and end point of the gesture. It may also include the direction, speed, velocity, acceleration, pressure, duration, or the type of gesture. Examples of gestures include but are not limited to drag, scroll, pinch, toggle, tap, double-tap, long press, swipe, or rotate. Gestures may be translated into camera control instructions by one or more of the following: direct lookup, range scaling, threshold triggering, state-based interpretation, mathematical function, machine learning algorithms, or artificial intelligence processing. In various embodiments, server 106 includes predictive processing capabilities that analyze gesture patterns and context to provide enhanced camera control. The server may maintain user preference profiles, learning algorithms, and adaptation modules that continuously improve system performance.

In some embodiments, camera 112 is a remotely installed camera with controllable functions. For example, camera 112 may be mounted on one or more motors allowing the camera to rotate and change its view. Additional examples of controllable camera functions include zoom, focus, aperture control, color balance, image stabilization, night vision activation, infrared control, motion detection sensitivity, and/or audio recording controls. Camera 112 receives and executes camera control instructions from server 106. Changes to camera functions may be immediately viewed via a live stream displayed on client 102, providing instant feedback to the user. In some embodiments, camera 112 includes local processing capabilities for basic autonomous functions such as motion tracking, face detection, or automatic exposure adjustment.

Figure 2:
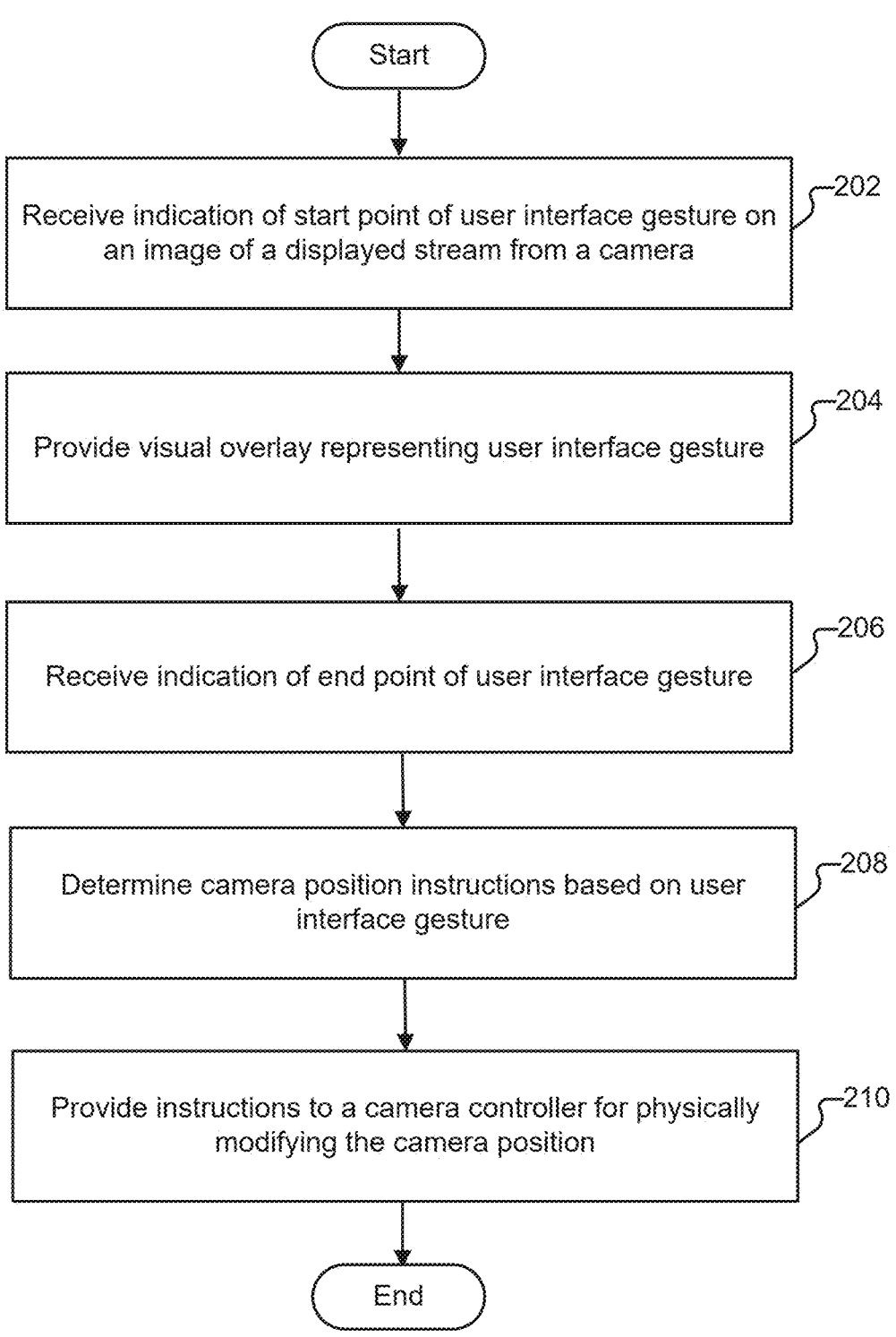
FIG. 2 is a flow chart illustrating an embodiment of a process for a camera control user interface.

FIG. 2 is a flow chart illustrating an embodiment of a process for a camera control user interface. For example, using the process of FIG. 2, a user interacts with a camera control user interface to operate a remote camera. The user interface maps the user's gestures into camera instructions, which are executed by the remote camera. In some embodiments, the process of FIG. 2 is executed by client 102, server 106, and camera 112 of FIG. 1 and utilizes network 104 of FIG. 1 to receive and send data between the modules.

At 202, an indication of a start point of a user interface gesture on an image of a displayed stream from a camera is received. For example, a coordinate corresponding to the beginning of the user interface gesture on the image of the displayed camera is received. The received indication may be a coordinate represented in two dimensional Cartesian coordinates, three dimensional Cartesian coordinates, polar coordinates, spherical coordinates, or any other method of indicating a point in a region of space. In some embodiments, the indication of the start point may include additional interaction data such as the user interface gesture input type, pressure sensitivity, timing information, or contextual data. Examples of user interface gesture input types include but are not limited to a tap, swipe, drag, pinch, or multi-touch combination. In some embodiments, the image of the displayed camera stream is presented on client 102 of FIG. 1 and the indication of the start point of the user interface gesture is received at server 106 of FIG. 1.

At 204, a visual overlay representing the user interface gesture is provided. For example, a visual icon is superimposed onto the image of the displayed camera stream to indicate the received indication of the user interface gesture start point. Examples of visual icons include a crosshair, laser pointer, cursor, arrow, trajectory line, movement prediction indicator, or any other shape with or without color that could represent the start point of the user interface gesture. The visual overlay provides the user with immediate visual feedback on how the system processes their gestures, improving the user experience as well as allowing the user to correct their gestures as needed. In some embodiments, the visual overlay includes predictive elements showing anticipated camera movement or suggested optimal gestures.

At 206, an indication of the end point of the user interface gesture is received. The indication of the end point may have the same formatting as the indication of the start point. It may also include additional interaction data such as gesture completion confirmation, final pressure reading, or gesture validation status. In some embodiments, if the end point of the user interface gesture is outside of the boundary of the user interface or the image of the displayed camera stream, the gesture may be cancelled, modified, or extended using predictive algorithms to determine user intent. For example, the end point may be the last position of the user interface gesture within the boundaries of the user interface gesture region, or intended movement beyond the boundary may be extrapolated. In some embodiments, the indication of the end point of the user interface gesture is received at server 106 of FIG. 1.

At 208, camera position instructions based on the user interface gesture are determined. For example, the received indications of the start and end points of the user interface gesture are used to determine the camera position instructions. Measurements such as distance, angle, velocity, acceleration, and gesture pattern recognition may be determined from the start and end points of the user interface gesture and mapped into camera position instructions such as pan, tilt, zoom, and focus adjustments. Additional measurements that may be determined include speed, velocity, acceleration, pressure variation, and gesture complexity of the user interface gesture. In some embodiments, the amplitudes of changes for current pan and tilt settings are determined based on the distance and angle of the user interface gesture, environmental context, lighting conditions, and learned user preferences. The amplitudes of changes for pan and tilt settings may also be based on corresponding physical distances in a real-world view of the camera, virtual mapping schemes, or may include calculating a point corresponding to a new region of interest. For example, the new region of interest may be based on the amplitudes of changes for the pan and tilt settings, object detection results, or be the end point of the user interface gesture. In some embodiments, camera position instructions are determined from calculated measurements through direct mapping, range scaling, threshold triggers, mathematical functions, machine learning algorithms, or artificial intelligence processing. In various embodiments, camera position instructions are determined by a server such as server 106 of FIG. 1.

At 210, the instructions for physically modifying the camera position are provided to a camera controller. For example, camera position instructions determined from step 208 are sent to and received by a camera controller. Upon receiving the instructions, the camera controller executes the received instructions, and the change is visible on the user interface displaying the stream from the camera. In some embodiments, the camera controller receives and executes the camera instructions via an application programming interface. Examples of application programming interfaces include but are not limited to RESTful, MQTT-based, WebSocket-based, or event-driven application programming interfaces. In various embodiments, the camera is camera 112 of FIG. 1. Additionally, the system may provide confirmation feedback to the user indicating successful execution of the camera control instructions.

Figure 3A:
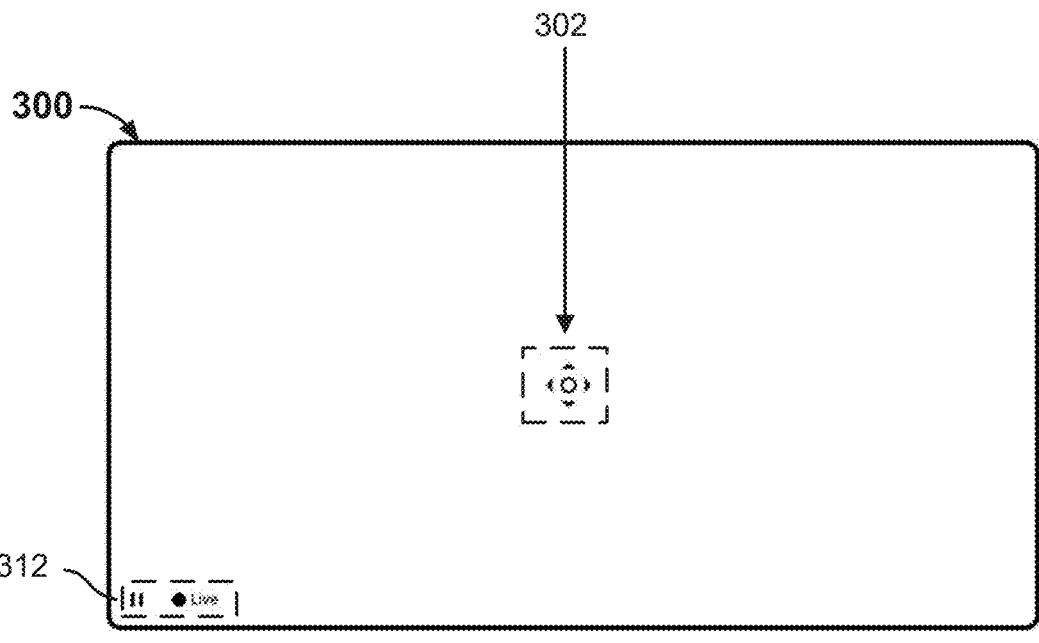
FIG. 3A is a diagram illustrating an embodiment of a camera control user interface.

FIG. 3A is a diagram illustrating an embodiment of a camera control user interface. In some embodiments, user interface 300 is provided by a device such as client 102 of FIG. 1 for controlling a remote camera such as camera 112 of FIG. 1. For example, user interface 300 is a graphical tool for controlling a remote camera that also displays the stream of the camera. A user can interact with user interface 300 through gestures to control the camera. Icon 302 is a visual indicator representing the default starting location of the user's gesture to user interface 300. Examples of methods to interact with user interface 300 include physical touch, a mouse, a remote controller, or a trackpad. In some embodiments, the default position of icon 302 is the center of user interface 300. Camera stream controls and indicators 312 provide additional functionality to user interface 300. For example, camera stream controls and indicators 312 may include a button for toggling pause and play for the displayed camera stream on user interface 300, a visual icon indicating whether the displayed camera stream on user interface 300 is live, recording status indicators, network connection quality indicators, and/or timestamp displays. As another example, camera stream controls and indicators 312 may include a button that displays a list of selectable presets corresponding to predefined pan, tilt, and zoom settings of the camera when toggled.

Figure 3B:
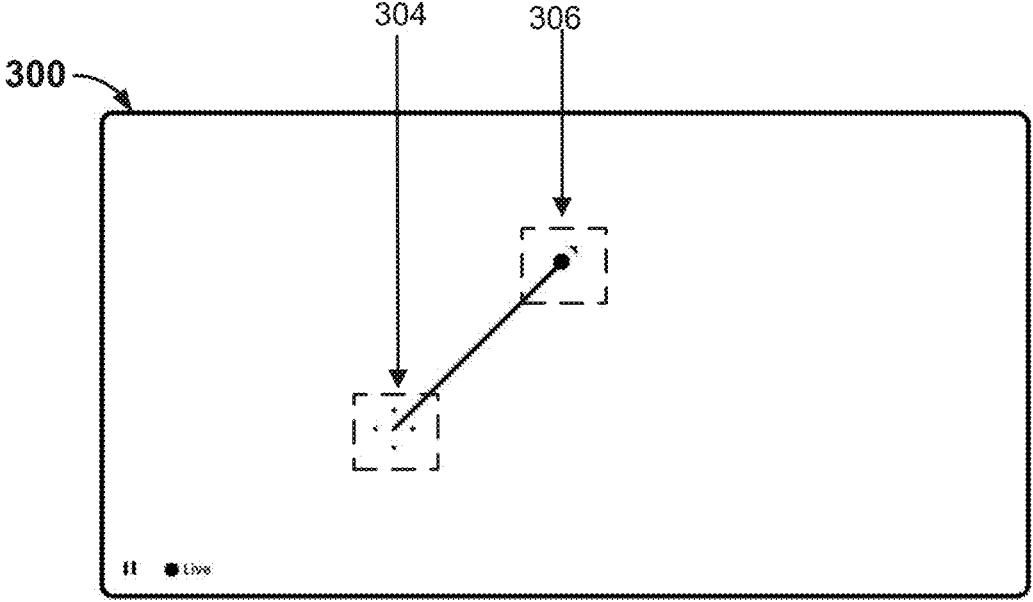
FIG. 3B is a diagram illustrating an embodiment of a performed drag gesture on a camera control user interface for controlling camera position.

FIG. 3B is a diagram illustrating an embodiment of a performed drag gesture on a camera control user interface for controlling camera position. As shown in FIG. 3B, the drag gesture is visually represented by an overlay displaying a line from start point 304 to current position 306 of the user interface gesture. The visual overlay may include additional elements such as distance measurements, angle indicators, predicted endpoint markers, or color-coded feedback indicating gesture validity. When the user interface gesture is completed, current position 306 becomes the end point of the user gesture. In some embodiments, start point 304 and current position 306 are measured and transmitted to a server, such as server 106 of FIG. 1, to be translated into camera control instructions. For example, distance between the start and end points of the user drag gesture may be calculated using various distance metrics. Examples of formulas for measuring distance between start and end points of the user drag gesture include but are not limited to Euclidean distance, Manhattan distance, Minkowski distance, or custom weighted distance functions that account for camera limitations and scene context. In various embodiments, the measured distance corresponds to the magnitude of change for the pan settings of the camera, with optional scaling factors and acceleration curves applied. The angle between the start and end points of the user drag gesture may also be calculated using trigonometric functions, vector mathematics, or machine learning models trained on user gesture patterns. For example, the angle is measured and corresponds to the amplitude of change for the tilt settings of the camera, with optional compensation for camera orientation and gimbal limitations.

In some embodiments, the angle (e.g., in degrees) of the drag gesture is determined using the following formula with inputs being end and start drag gesture top coordinate component (e.g., y-coordinate) and left coordinate component (e.g., x-coordinate) inputs:

$$\text{degrees} = \frac{\text{atan2}(\text{drag}_{end} \cdot \text{top} - \text{drag}_{start} \cdot \text{top}, \text{drag}_{end} \cdot \text{left} - \text{drag}_{start} \cdot \text{left}) \cdot 180}{\pi}$$

In some embodiments, the distance of the drag gesture is determined using the following formula with inputs being start and end drag gesture left coordinate component (e.g., x-coordinate) and top coordinate component (e.g., y-coordinate) inputs:

$$\text{distance} = \sqrt{(\text{drag}_{start} \cdot \text{left} - \text{drag}_{end} \cdot \text{left})^2 + (\text{drag}_{start} \cdot \text{top} - \text{drag}_{end} \cdot \text{top})^2}$$

Given the angle in degrees and the distance, in some embodiments, a new region of interest (ROI) coordinate (e.g., new camera position center point) is determined using the following formulas:

$$x = \cos\left(\frac{\pi \cdot \text{degrees}}{180}\right) \cdot \text{distance}$$

$$y = \sin\left(\frac{\pi \cdot \text{degrees}}{180}\right) \cdot \text{distance}$$

$$ROI = (x, y)$$

Figure 3C:
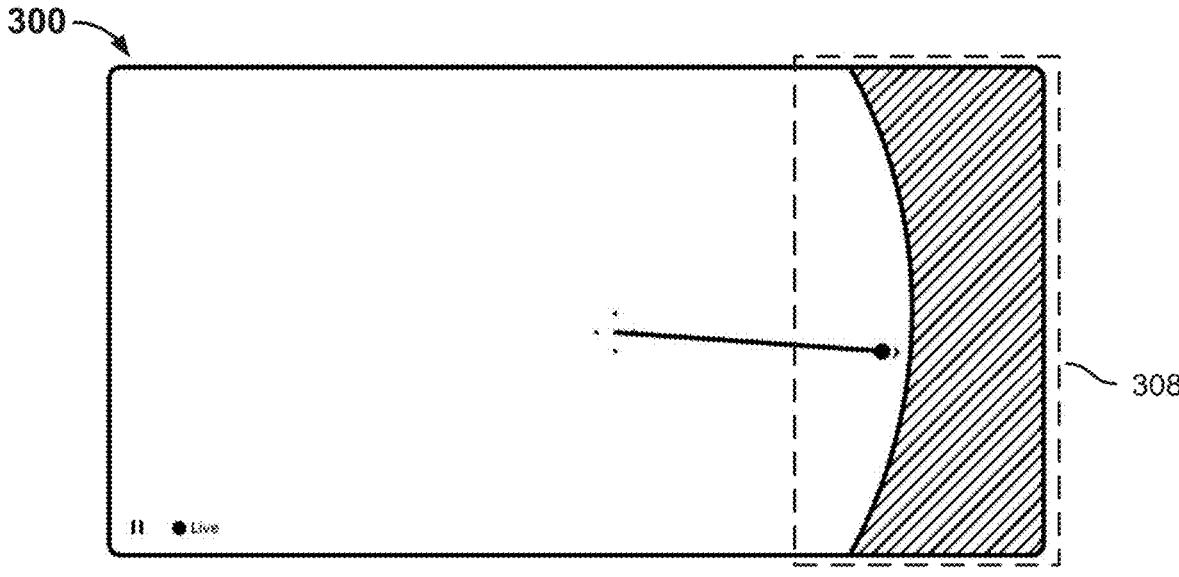
FIG. 3C is a diagram illustrating an embodiment of the camera control user interface with a performed drag gesture extending beyond the limits of the camera.

FIG. 3C is a diagram illustrating an embodiment of the camera control user interface with a performed drag gesture extending beyond the limits of the camera. In some embodiments, visual indication 308 is provided when the magnitude of the user interface gesture corresponds to exceeding the pan and tilt limits of the camera. For example, visual indication 308 may include graying out an area of the image that corresponds to exceeding the pan and tilt limits. User interface 300 may also prevent the drag gesture from extending past the corresponding pan and tilt limits of the camera.

Figure 4A:
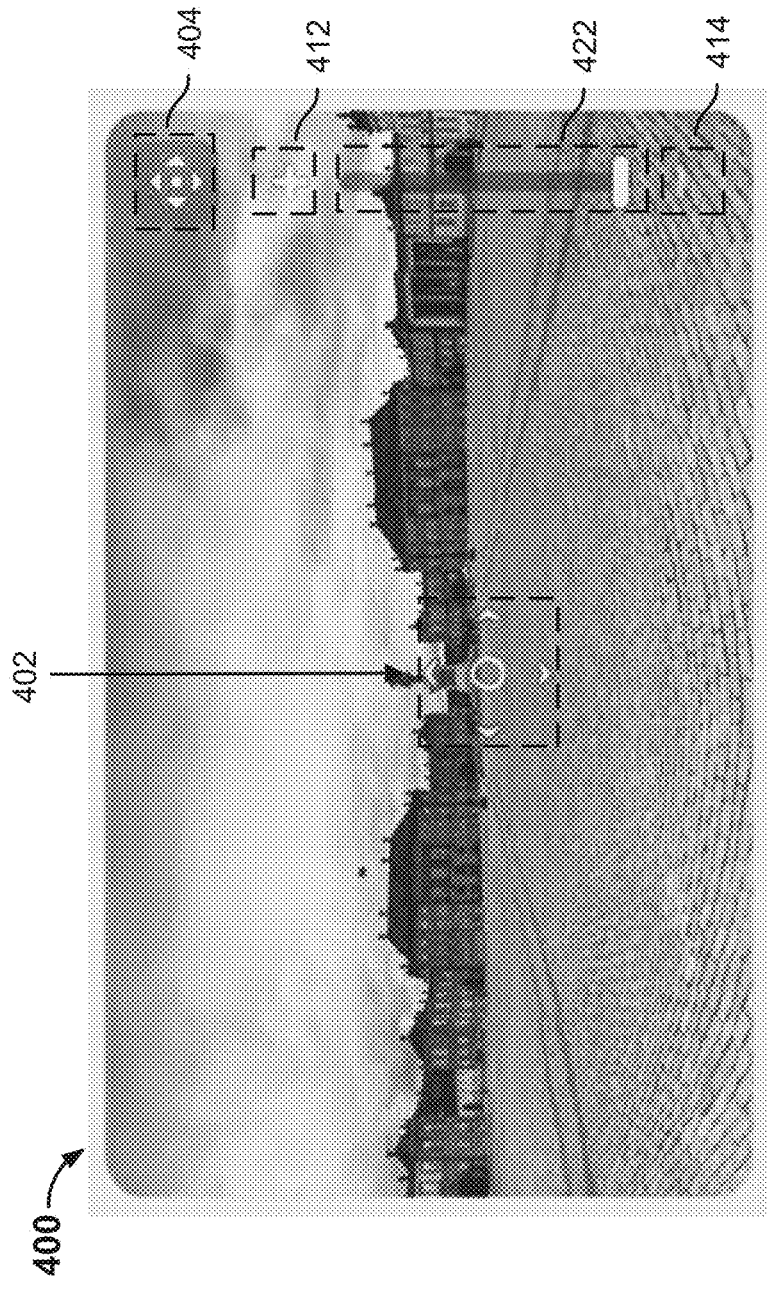
FIG. 4A is a diagram illustrating an embodiment of a camera control user interface with a zoom control interface for modifying the zoom setting of a camera.

FIG. 4A is a diagram illustrating an embodiment of a camera control user interface with a zoom control interface for modifying the zoom setting of a camera. In some embodiments, user interface 400 is provided by a device such as client 102 of FIG. 1 for controlling a remote camera such as camera 112 of FIG. 1. In the example shown, user interface 400 displays a camera stream and includes various interactable features for controlling the camera stream, such as cursor 402, navigational button 404, zoom in button 412, zoom out button 414, and zoom scale slider 422. In some embodiments, cursor 402 represents the location of the interaction between the user and user interface 400. For example, the user may use cursor 402 to perform the drag gesture on user interface 400 shown in FIG. 3B. In various embodiments, cursor 402 is icon 302 of FIG. 3A and user interface 400 includes the visual elements and functionality of user interface 300 of FIGS. 3A-C. In some embodiments, interacting with navigational button 404 resets the camera settings. For example, the camera settings may be returned to the default pan and tilt settings or the predefined pan and tilt settings.

Figure 4B:
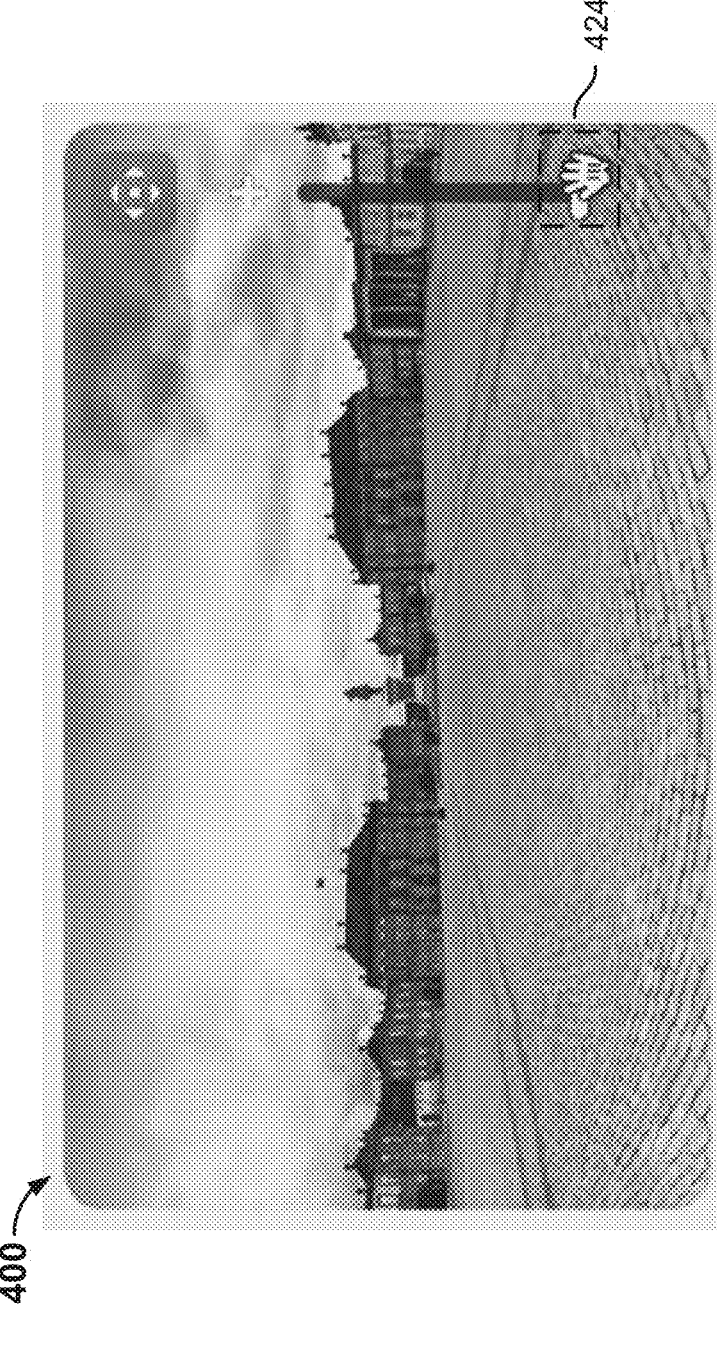
FIG. 4B is a diagram illustrating an embodiment of the camera control user interface with a zoom scale slider hover interaction.

FIG. 4B is a diagram illustrating an embodiment of the camera control user interface with a zoom scale slider hover interaction. In the example shown, the user is hovering over zoom scale slider 422. Upon hovering, pointer cursor 424 is displayed to inform the user that zoom scale slider 422 is an interactable feature. In some embodiments, cursor 402 becomes pointer cursor 424 when the user interacts with zoom scale slider 422.

Figure 4C:
FIG. 4C is a diagram illustrating an embodiment of the camera control user interface with a zoom scale slider select interaction.

FIG. 4C is a diagram illustrating an embodiment of the camera control user interface with a zoom scale slider select interaction. In the example shown, zoom scale slider handle 426 has been selected and tooltip 428 is provided. Tooltip 428 lists the current zoom scale of the connected camera when zoom scale slider handle 426 is selected. The user can drag zoom scale slider handle 426 along zoom scale slider 422 to modify the zoom setting of the camera. As zoom scale slider handle 426 is dragged, tooltip 428 displays the corresponding zoom setting of the camera. In some embodiments, as zoom scale slider handle 426 is selected and modified, the zoom scale slider interactions are converted into camera zoom instructions, which are immediately executed by the connected camera and reflected on user interface 400.

Figure 4D:
FIG. 4D is a diagram illustrating an embodiment of the camera control user interface after a zoom scale slider interaction.

FIG. 4D is a diagram illustrating an embodiment of the camera control user interface after a zoom scale slider interaction. As shown in the example, zoom scale slider handle 426 is at an elevated position in zoom scale slider 422. This modification in zoom settings has been executed by the camera and is evident in the stream displayed in user interface 400. In some embodiments, the position of zoom scale slider handle 426 on zoom scale slider 422 corresponds to a zoom setting on the camera. For example, as zoom scale slider handle 426 is dragged upwards on zoom scale slider 422, the corresponding zoom scale on the camera increases. In various embodiments, zoom scale slider 422 may prevent the user from inputting a zoom scale incompatible with the camera's physical zoom scaling abilities. For example, the maximum and minimum values that could be input through zoom scale slider 422 correspond to the maximum and minimum zoom scale settings of the camera.

Figure 4E:
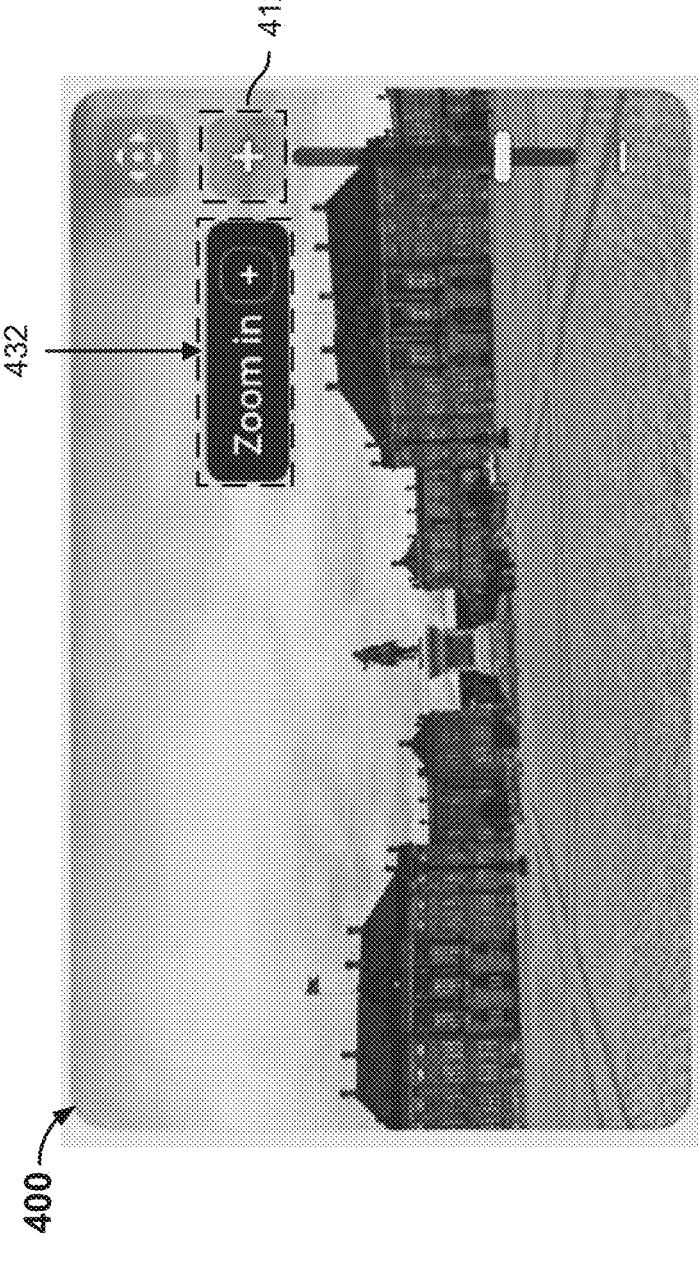
FIG. 4E is a diagram illustrating an embodiment of the camera control user interface with a zoom in button interaction.

FIG. 4E is a diagram illustrating an embodiment of the camera control user interface with a zoom in button interaction. In the example shown, the user is hovering over zoom in button 412. Zoom in button 412 may become highlighted upon user interaction and zoom in tooltip 432 may appear. In some embodiments, every tap interaction of the zoom in button 412 increases the zoom setting of the camera by a set amount. In various embodiments, the amount of time the zoom in button 412 is held down corresponds to a scaled increase in the zoom scale settings of the camera. For example, holding down zoom in button 412 for a longer period of time corresponds to a greater increase in the camera zoom settings.

Figure 4F:
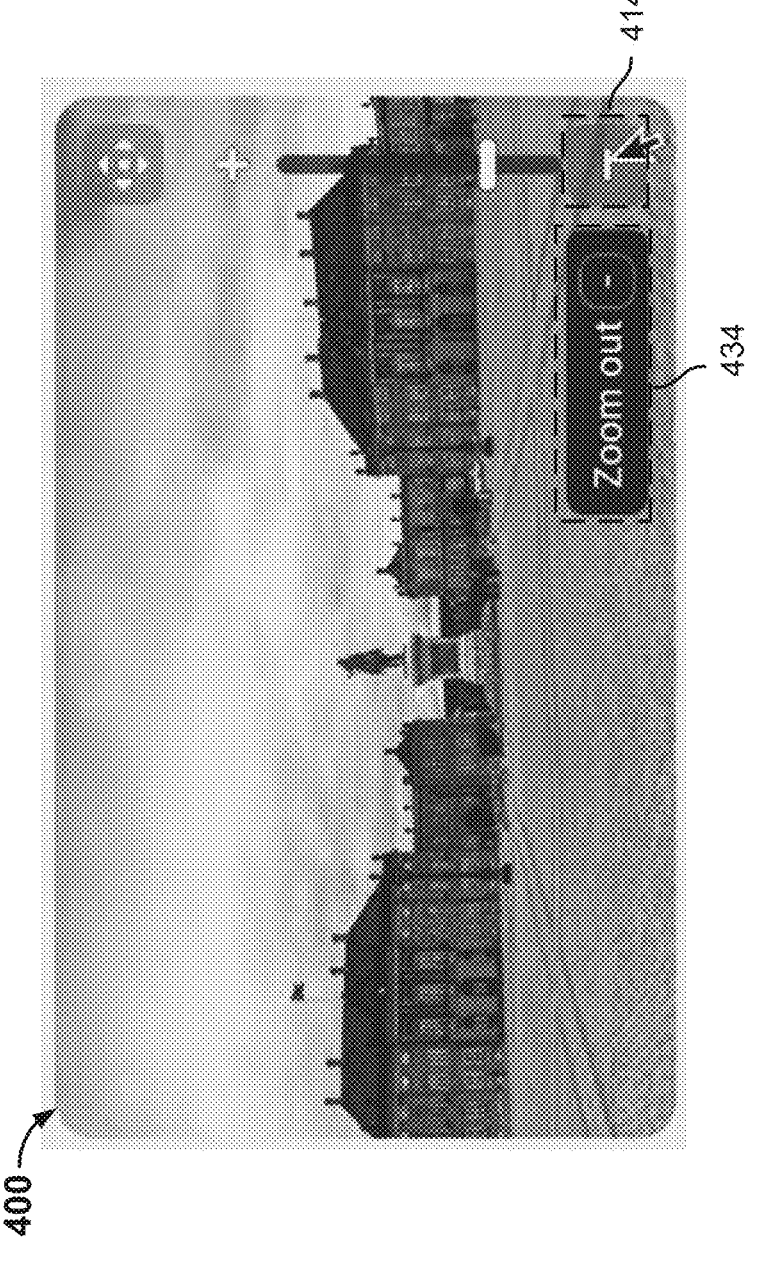
FIG. 4F is a diagram illustrating an embodiment of the camera control user interface with a zoom out button interaction.

FIG. 4F is a diagram illustrating an embodiment of the camera control user interface with a zoom out button interaction. In the example shown, the user is hovering over zoom out button 414. Zoom out button 414 may become highlighted upon user interaction and zoom out tooltip 434 may appear. In some embodiments, every tap interaction of the zoom out button 414 decreases the zoom setting of the camera by a set amount. In various embodiments, the amount of time the zoom out button 414 is held down corresponds to a scaled decrease in the zoom scale settings of the camera. For example, holding down zoom out button 414 for a longer period of time corresponds to a greater decrease in the camera zoom settings.

Figure 4G:
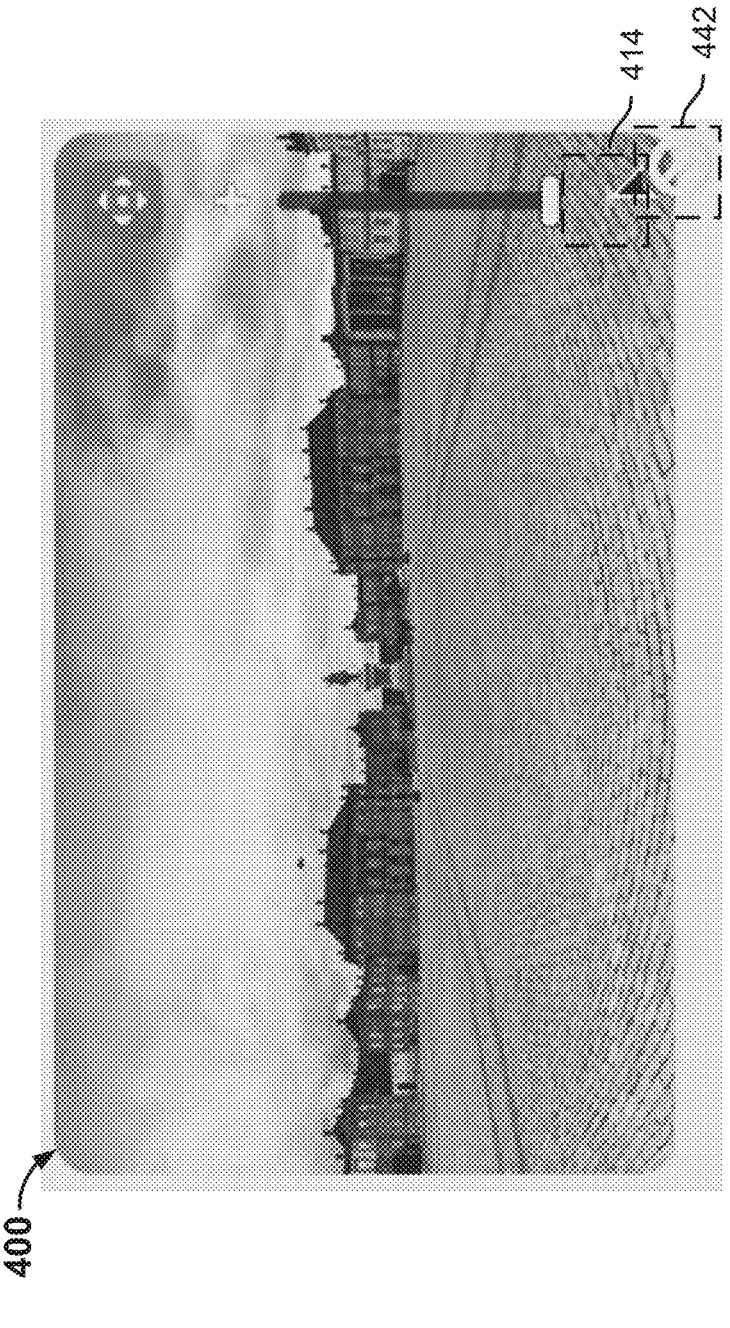
FIG. 4G is a diagram illustrating an embodiment of the camera control user interface with a disabled zoom out button interaction.

FIG. 4G is a diagram illustrating an embodiment of the camera control user interface with a disabled zoom out button interaction. For example, when the zoom setting is at a minimum level, the zoom out button is disabled. As shown in the example, disabled tooltip 442 is displayed upon user interaction with zoom out button 414 when the zoom out button is disabled to inform the user that the camera has reached its minimum zoom out setting. In some embodiments, a similar disabled tooltip will appear upon interaction with zoom in button 412 when the maximum zoom settings of the camera have been reached.

Figure 5:
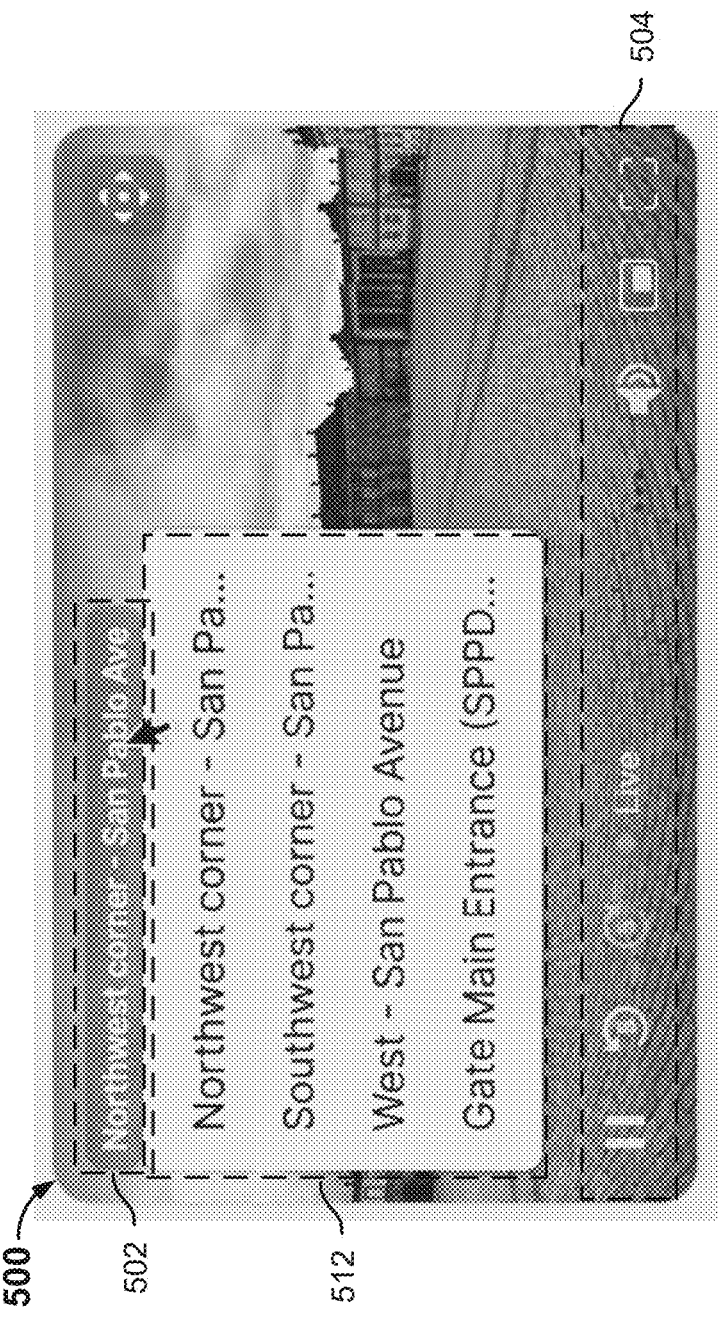
FIG. 5 is a diagram illustrating an embodiment of a camera control user interface for navigating between multiple cameras.

FIG. 5 is a diagram illustrating an embodiment of a camera control user interface for navigating between multiple cameras. In some embodiments, user interface 500 is provided by a device such as client 102 of FIG. 1 for controlling a remote camera such as camera 112 of FIG. 1. In the example shown, user interface 500 displays a camera stream and includes location dropdown menu 502, camera stream controls and indicators 504, and location navigator 512.

In some embodiments, user interface 500 displays location navigator 512 upon user interaction with location dropdown menu 502. Location navigator 512 displays one or more additional cameras connected to user interface 500 via a network, such as network 104 of FIG. 1. For example, the user can switch to a different camera by selecting a listed camera location in location navigator 512. Once selected, the displayed stream in user interface 500 will switch to the stream of the selected camera and the user can control the selected camera through user interface 500. Location navigator 512 allows the user to quickly switch between cameras connected to the same network with case.

In some embodiments, camera stream controls and indicators 504 display a variety of interactable user interface features for controlling the displayed camera stream on user interface 500. Examples of user interface features include but are not limited to buttons for pausing, playing, rewinding, or forwarding the displayed stream, increasing the sound of the stream, changing the size of user interface 500, or a visual indicator for when the displayed stream is live. In some embodiments, camera stream controls and indicators 504 is camera stream controls and indicators 312 of FIG. 3A.

Figure 6:
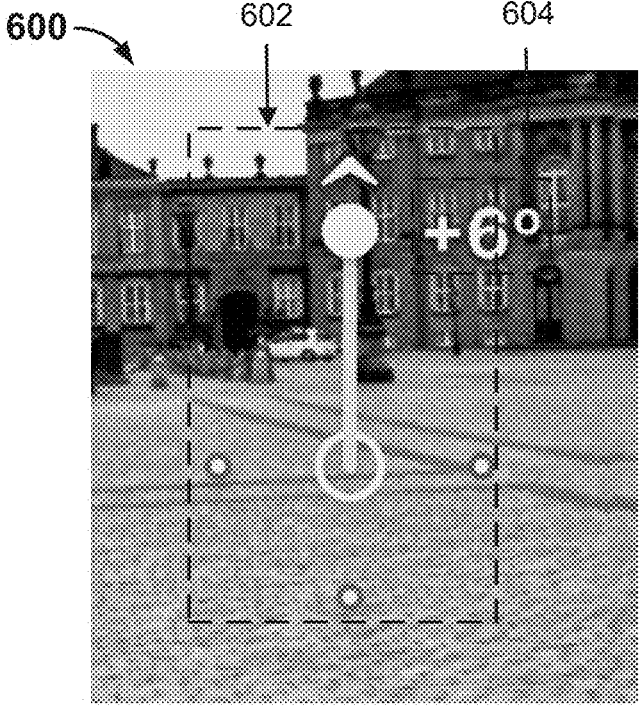
FIG. 6 is a diagram illustrating an embodiment of a camera control user interface during a user interface gesture.

FIG. 6 is a diagram illustrating an embodiment of a camera control user interface during a user interface gesture. In some embodiments, user interface 600 is part of a user interface with a displayed stream from a camera. In the example shown, user interface 600 contains gesture 602 and angle indicator 604. Gesture 602 provides a visual overlay representing a drag gesture. For example, the beginning of gesture 602 is the start point of the user interface gesture and the arrow of gesture 602 is the current location of the user interface gesture. When the gesture is completed, the gesture is translated into camera instructions and executed by the camera. In some embodiments, angle indicator 604 displays a numerical value representing the angle of the user interface gesture in real-time.

Figure 7:
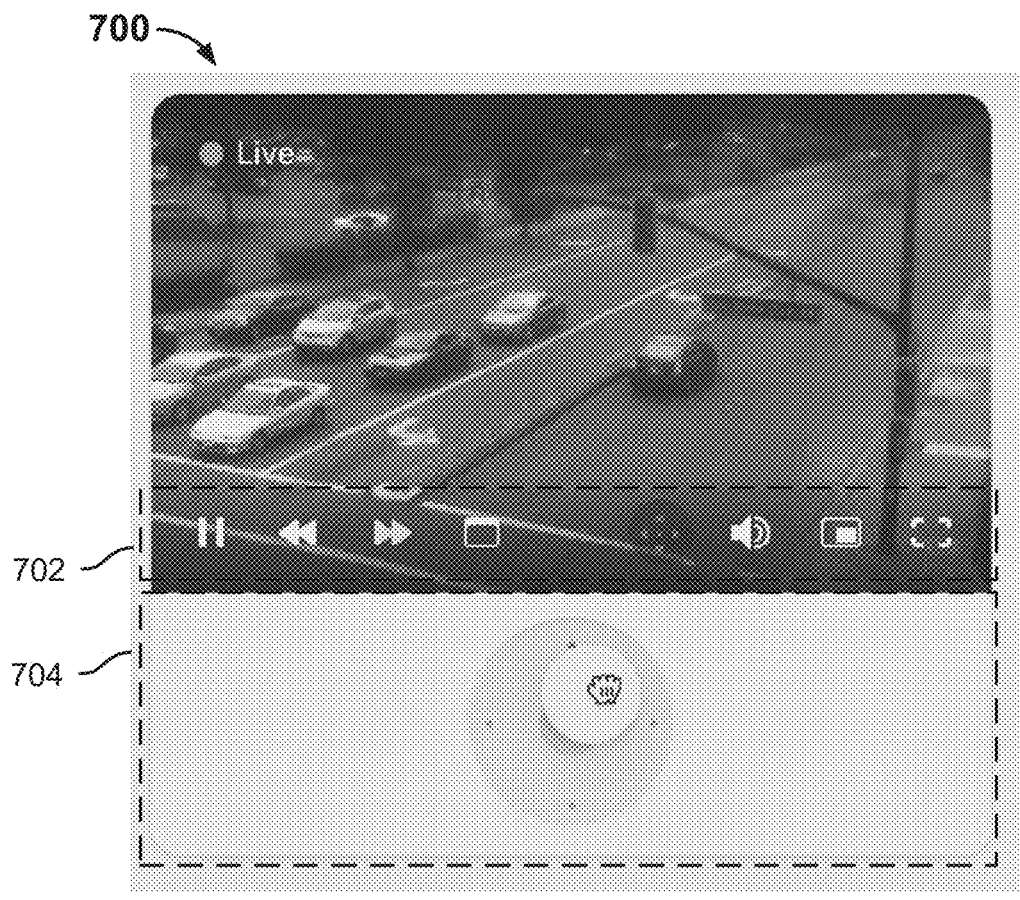
FIG. 7 is a diagram illustrating an embodiment of a camera control user interface with a joystick controller.

FIG. 7 is a diagram illustrating an embodiment of a camera control user interface with a joystick controller. For example, user interface 700 provides a joystick controller overlaid on a displayed stream. In some embodiments, user interface 700 is provided by a device such as client 102 of FIG. 1 for controlling a remote camera such as camera 112 of FIG. 1. As shown in FIG. 7, user interface 700 includes camera stream controls and indicators 702 and joystick controller 704. In some embodiments, camera stream controls and indicators 702 is camera stream controls and indicators 312 of FIG. 3A and camera stream controls and indicators 504 of FIG. 5. For example, camera stream controls and indicators 702 contains buttons, togglable user interface elements, and other user interface elements for controlling the camera stream. In some embodiments, camera stream controls and indicators 702 may include a button for resetting at least the camera pan settings to a default or predefined setting.

In some embodiments, joystick controller 704 can be used to operate the camera whose stream is displayed on user interface 700. For example, a joystick movement is input through joystick controller 704 and received by user interface 700. The joystick movement is sent to a server, such as server 106 of FIG. 1, and translated into camera instructions. The camera instructions are provided to the connected camera, such as camera 112 of FIG. 1 and executed. The executed camera commands are visible through the displayed stream on user interface 700. In some embodiments, the server receives the direction of the joystick gesture, and the direction corresponds to a direction for a pan or tilt camera instruction. For example, a joystick gesture in a leftwards motion may correspond to a leftwards pan by the connected camera. The magnitude of the camera pan may be correspond to a duration time of a gesture. As an example, holding joystick controller 704 to the left for a longer period of time results in a longer leftwards pan of the connected camera. In various embodiments, additional controls may be implemented through joystick controller 704, such as a tap of the joystick or a sequence of joystick patterns, and mapped to other camera controls, such as reset camera settings or zoom. Joystick controller 704 may be operated using physical input, such as one's finger, a mouse, or an external device, such as a remote controller.

Figure 8:
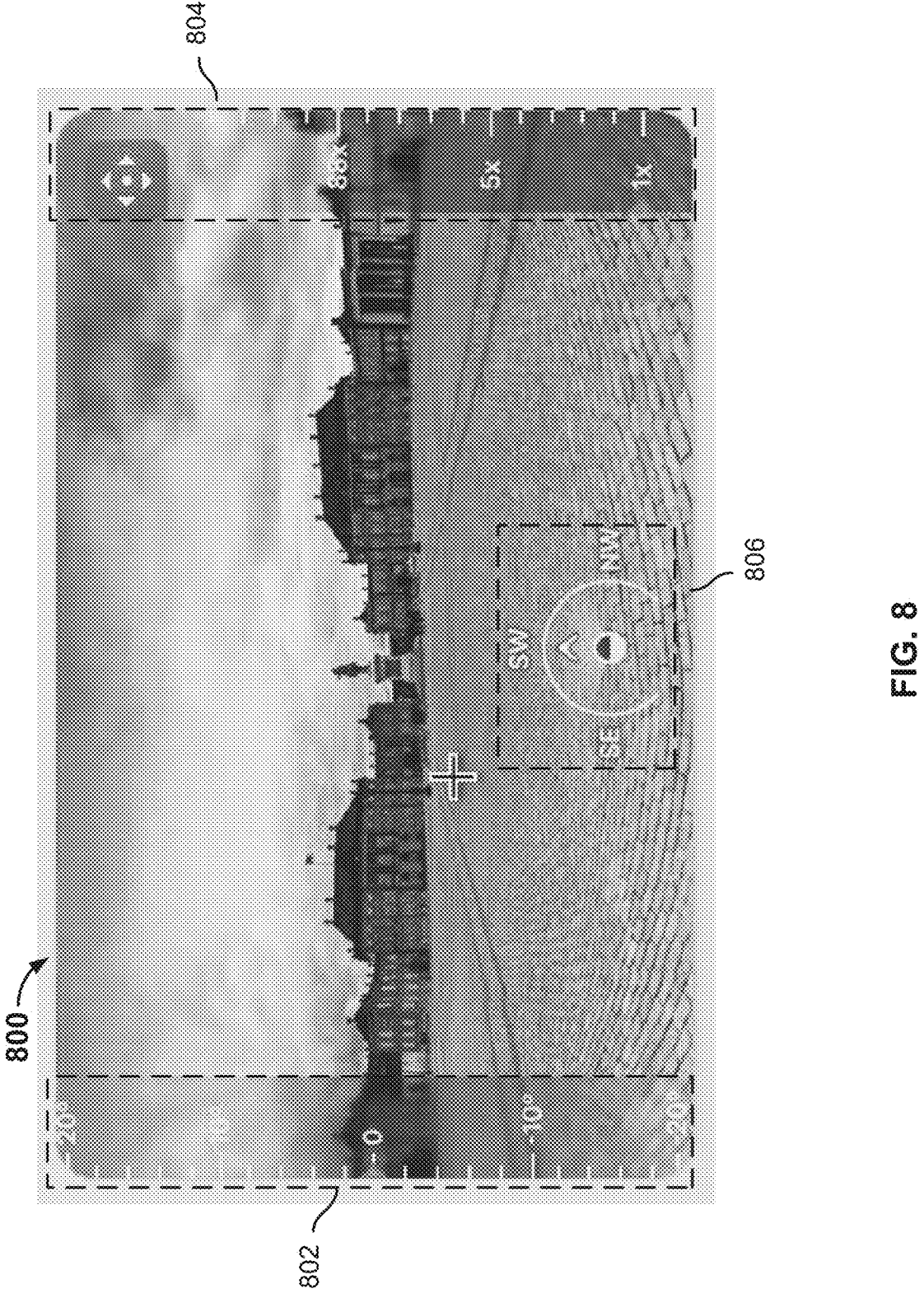
FIG. 8 is a diagram illustrating an embodiment of a camera control user interface with additional methods of camera control through user interface gestures.

FIG. 8 is a diagram illustrating an embodiment of a camera control user interface with additional methods of camera control through user interface gestures. For example, the user interface may provide one or more rulers corresponding to camera setting controls overlaid on the displayed stream. It may also include a compass pan controller overlaid on the displayed stream. In the example shown, user interface 800 includes tilt control ruler 802, zoom control ruler 804, and compass pan controller 806. In some embodiments, user interface 800 is provided by a device such as client 102 of FIG. 1 for controlling a remote camera such as camera 112 of FIG. 1.

In some embodiments, tilt control ruler 802 has tilt angle markings and selecting a location on the ruler modifies the current tilt setting of the camera to the tilt angle corresponding to the selected location on the ruler. For example, selecting the location on tilt control ruler 802 corresponding to a tilt angle of –10 degrees modifies the current tilt setting of the camera by setting the tilt angle to –10 degrees. The tilt angle markings may represent camera tilt amounts relative to the default position or current position. In some embodiments, the middle of tilt control ruler 802 represents the default camera tilt setting or no applied camera tilt. Tilt markings on the bottom half of tilt control ruler 802 represent downward camera tilt settings and tilt markings on the upper half of tilt control ruler 802 represent upward camera tilt settings. In some embodiments, tilt control ruler 802 may display a visual marker to indicate the current tilt settings.

In some embodiments, zoom control ruler 804 has zoom scale markings and selecting a location on the ruler modifies the current zoom settings of the camera to the zoom scale corresponding to the selected location on the ruler. For example, the default zoom setting for the camera is the minimum focal length, which is visualized as the widest angle on the environment, and a location on zoom control ruler 804 can be selected to increase the zoom settings of the camera. In various embodiments, locations on zoom control ruler 804 correspond to zoom scales for zooming in and zooming out.

In some embodiments, compass pan controller 806 can be interacted with to control the current camera pan settings. For example, selecting the left side of the compass results in a leftwards pan of the camera while selecting the right side of the compass results in a rightwards pan of the camera. In some embodiments, the compass provides a bird eye view of the camera and an interactable region that maps to a pan in a certain direction. The compass may also include symbols indicating the direction the camera is looking.

Figure 9:
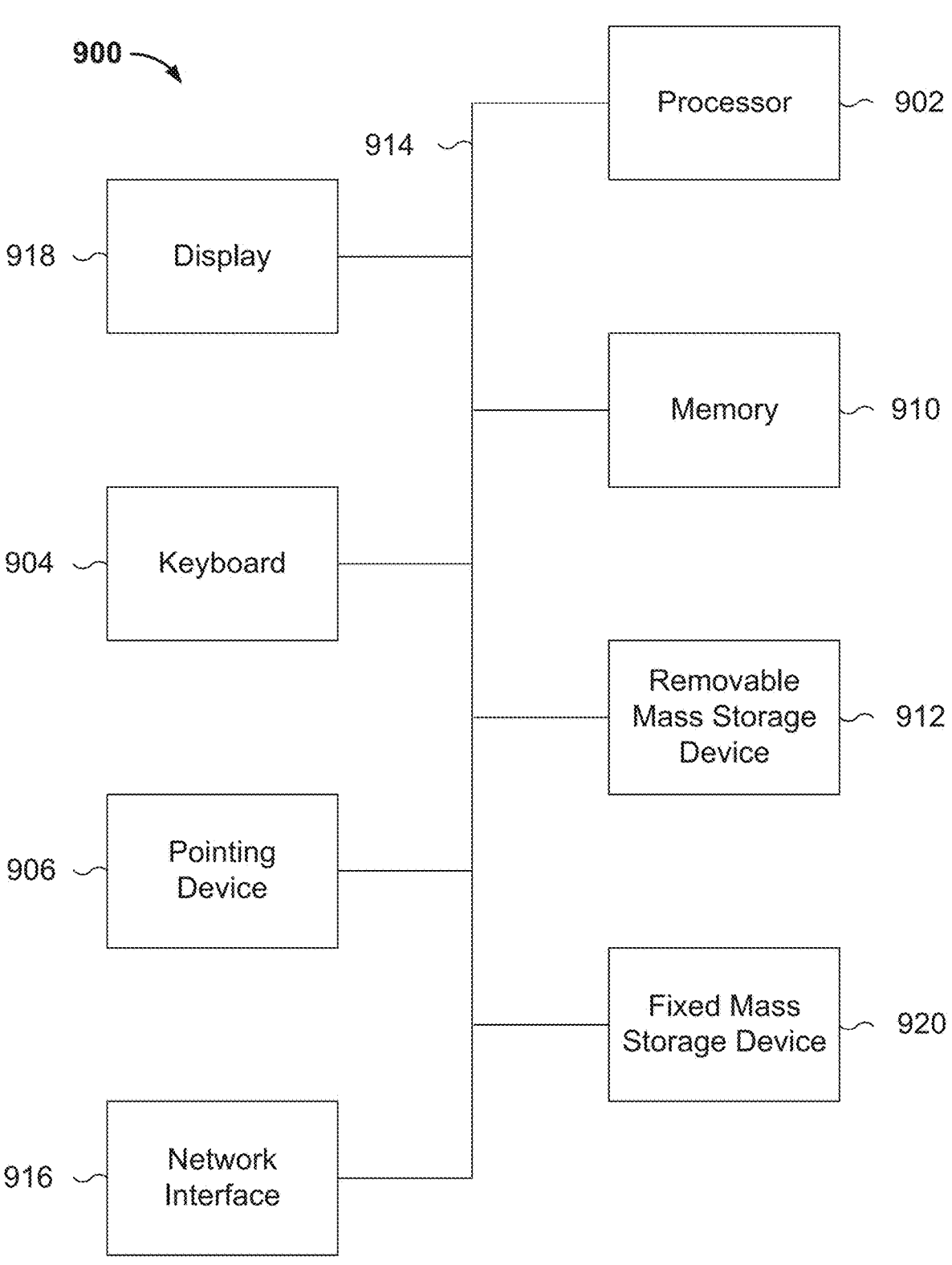
FIG. 9 is a functional diagram illustrating an embodiment of a programmed computer system for performing remote control of a camera through a camera control user interface.

FIG. 9 is a functional diagram illustrating a programmed computer system for performing remote control of a camera through a camera control user interface. As will be apparent, other computer system architectures and configurations can be utilized for performing remote control of a camera through a camera control user interface. Examples of computer system 900 include client 102 of FIG. 1, one or more computers used to implement server 106 of FIG. 1, and camera 112 of FIG. 1. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In various embodiments, one or more instances of computer system 900 can be used to implement at least portions of the processes of FIG. 2.

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data and objects used by the processor 902 to perform its functions (e.g., programmed instructions). For example, memory 910 can include any suitable computer-readable storage media, described below, depending on whether, for example, data access needs to be bi-directional or unidirectional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or unidirectionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or tele-communications network using a network connection as shown. For example, through the network interface 916, the processor 902 can receive information (e.g., data objects or program instructions) from another network or output infor-mation to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments dis-closed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized inter-faces that allow the processor 902 to send and, more typically, receive data from other devices such as micro-phones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer read-able medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 9 is but an example of a computer system suitable for use with the various embodiments disclosed herein. Other computer systems suitable for such use can include additional or fewer sub-systems. In addition, bus 914 is illustrative of any intercon-nection scheme serving to link the subsystems. Other com-puter architectures having different configurations of subsystems can also be utilized.

Although the foregoing embodiments have been described in some detail for purposes of clarity of under-standing, the invention is not limited to the details provided. There are many alternative ways of implementing the inven-tion. The disclosed embodiments are illustrative and not restrictive.

14

What is claimed is:

1. A method, comprising:
   receiving an indication of a start point of a user interface gesture on an image of a displayed stream from a camera;
   providing a visual overlay representing a direction and a magnitude of the user interface gesture as the user interface gesture is updated while maintaining unchanged current pan and tilt settings of the displayed stream;
   receiving an indication of an end point of the user interface gesture;
   determining amplitudes of changes for the current pan and tilt settings based on a distance and an angle between the start point and the end point of the user interface gesture;
   generating pan and tilt control instructions based on the determined amplitudes of changes; and
   providing the generated pan and tilt control instructions to a camera controller for physically modifying pan and tilt of the camera after receiving the indication of the end point.

2. The method of claim 1, wherein the user interface gesture is a drag gesture from the start point to the end point.

3. The method of claim 1, wherein providing the visual overlay comprises displaying a line from the start point to a current position of the user interface gesture.

4. The method of claim 1, further comprising: providing a visual indication when the magnitude of the user interface gesture corresponds to exceeding pan and tilt limits of the camera.

5. The method of claim 4, wherein the visual indication includes graying out an area of the image that corresponds to exceeding the pan and tilt limits.

6. The method of claim 1, further comprising: providing a zoom control interface for modifying a zoom setting of the camera.

7. The method of claim 6, wherein the zoom control interface comprises a slider with a handle that, when selected, displays a tooltip indicating a current zoom scale.

8. The method of claim 6, wherein the zoom control interface includes a zoom-out button that is disabled when the zoom setting is at a minimum level.

9. The method of claim 6, wherein the zoom control interface comprises a ruler with zoom scale markings and selecting a location on the ruler modifies the zoom setting of the camera to a zoom scale corresponding to the selected location on the ruler.

10. The method of claim 1, further comprising: displaying a list of selectable presets corresponding to predefined pan and tilt settings of the camera.

11. The method of claim 1, wherein the visual overlay includes a numerical value representing an angle of the user interface gesture in real-time.

12. The method of claim 1, wherein the amplitudes of changes for the current pan and tilt settings determined based on the direction and magnitude of the user interface gesture on the display is based on corresponding physical distances in a real-world view of the camera.

13. The method of claim 1, wherein the amplitudes of changes for the current pan and tilt settings determined based on the direction and magnitude of the user interface gesture on the display is not based on corresponding physi-cal distances in a real-world view of the camera.

14. The method of claim 1, further comprising providing a joystick controller overlaid on the displayed stream.

15. The method of claim 1, further comprising providing a compass pan controller overlaid on the displayed stream.

16. The method of claim 1, further comprising providing a ruler with tilt angle markings and selecting a location on the ruler that modifies the current tilt setting of the camera to a tilt angle corresponding to the selected location on the ruler.

17. The method of claim 1, wherein determining the amplitudes of changes for the current pan and tilt settings includes calculating a point corresponding to a new region of interest.

18. A system, comprising:

a processor configured to:

receive an indication of a start point of a user interface gesture on an image of a displayed stream from a camera;

provide a visual overlay representing a direction and a magnitude of the user interface gesture as the user interface gesture is updated while maintaining unchanged current pan and tilt settings of the displayed stream;

receive an indication of an end point of the user interface gesture;

determine amplitudes of changes for the current pan and tilt settings based on a distance and an angle between the start point and the end point of the user interface gesture;

generate pan and tilt control instructions based on the determined amplitudes of changes; and provide the generated pan and tilt control instructions to a camera controller for physically modifying pan and tilt of the camera after receiving the indication of the end point; and a memory coupled to the processor and configured to provide the processor with instructions.

19. The system of claim 18, wherein the user interface gesture is a drag gesture from the start point to the end point.

20. A computer program product embodied in a non-transitory computer readable medium and comprising computer instructions for:

receiving an indication of a start point of a user interface gesture on an image of a displayed stream from a camera;

providing a visual overlay representing a direction and a magnitude of the user interface gesture as the user interface gesture is updated while maintaining unchanged current pan and tilt settings of the displayed stream;

receiving an indication of an end point of the user interface gesture;

determining amplitudes of changes for the current pan and tilt settings based on a distance and an angle between the start point and the end point of the user interface gesture;

generating pan and tilt control instructions based on the determined amplitudes of changes; and providing the generated pan and tilt control instructions to a camera controller for physically modifying pan and tilt of the camera after receiving the indication of the end point.

* * * * *